B. WEINBERGER.
FENDER FOR STREET CARS.
APPLICATION FILED APR. 17, 1911.
1,009,607.
Patented Nov. 21, 1911.
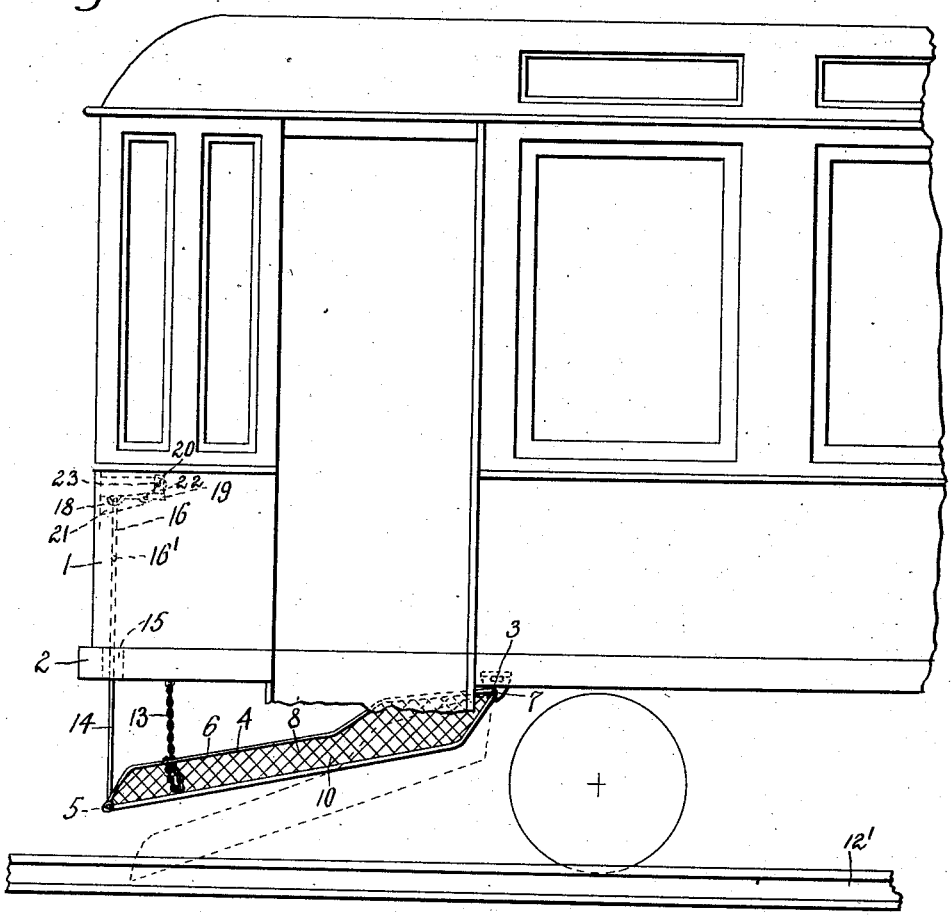
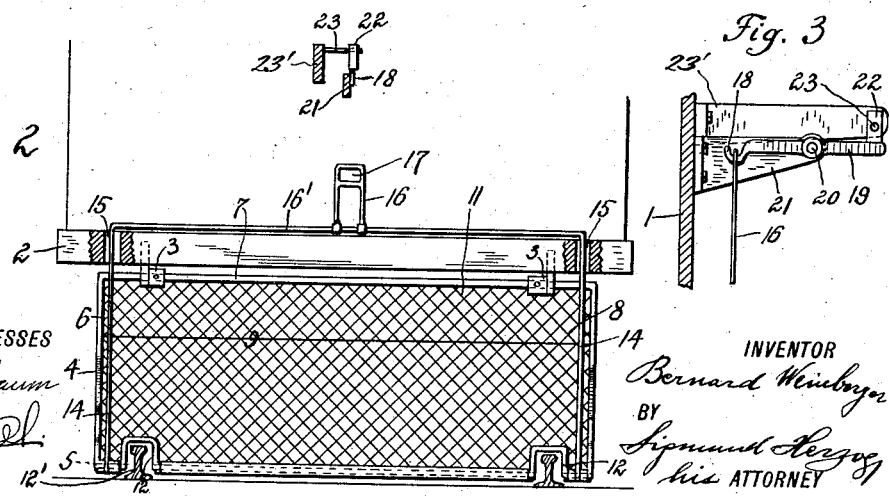

UNITED STATES PATENT OFFICE.

BERNARD WEINBERGER, OF NEW YORK, N. Y.

FENDER FOR STREET-CARS.

1,009,607. Specification of Letters Patent. Patented Nov. 21, 1911.

Application filed April 17, 1911. Serial No. 621,532.

*To all whom it may concern:*

Be it known that I, BERNARD WEINBERGER, a subject of the King of Hungary, and resident of the city of New York, in the county of New York and State of New York, have invented certain new and useful Improvements in Fenders for Street-Cars, of which the following is a specification.

The present invention relates to improvements in car fenders, and has for its object to provide a new and improved car fender which is simple and durable in construction, and arranged to readily pick up any living object or other obstruction in the path of the car.

Another object of the invention is to construct a device of this character which can be conveniently attached to a street car without necessitating any material changes of the latter.

With these and other objects in view, which will appear as the nature of the invention is better understood, the same consists in the combination, arrangement and construction of parts hereinafter fully described, pointed out in the appended claims and illustrated in the accompanying drawings, it being understood that many changes may be made in the size and proportion of the several parts and minor details of construction without departing from the spirit or sacrificing any of the advantages of the invention.

One of the many possible embodiments of the invention is illustrated in the accompanying drawings, in which:—

Figure 1 is a side elevation of the front portion of a street car with the improved fender thereon, the tread on which the feet are placed on ascending to or descending from the car being broken away; Fig. 2 is a front elevation, partly in section, of the device shown in Fig. 1; and Fig. 3 is a side elevation of a detail of construction.

In the drawings, the numeral 1 indicates the front portion of a street car of the usual construction, its platform being indicated by the numeral 2. To the inner end of this platform is pivoted at 3 the fender frame 4, which consists of a horizontal front bar 5, inclined and upwardly bent side bars 6, and the horizontal rear bar 7. This frame supports a wire netting 8 in the form of a basket, comprising a bottom 9, side walls 10, 10 and the rear wall 11. The front bar 5 is provided with a rubber covering, and is recessed near its ends, as shown at 12, 12, which recesses will engage the rails 12' when the fender is brought into its lowered position. The front bar 5 will thus almost touch the ground, when the fender is in its lowered position. The downward movement of the fender is limited by flexible connections 13, 13, attached to the car platform and the fender.

To the front bar 5 of the fender are pivotally attached rods 14, 14, projecting through holes 15, 15 in the platform above the same, and connected by a cross rod 16' above the platform. To this cross rod is attached an arm 16, provided at its upper end with an eye 17, which is adapted to be engaged by the hooked end 18 of a lever 19, the latter being pivoted at 20 to a bracket 21, which is attached to the car frame. The lever 19 is held in its normal, horizontal position by means of a stop 22, which is slidably arranged upon a bar 23, which is attached to a bracket 23' carried by the car frame.

The operation of the device is as follows: Under normal conditions, the fender is held in its raised position, as shown in Fig. 1 of the drawings, by means of the stop 22. When the motorman sees a person in dangerous proximity to the car, he moves the stop 22 sidewise, whereby the lever 19 will turn around its pivot, and the arm 16 be disengaged from the hooked end 18 of said lever. As soon as the arm 16 of the fender is disengaged from the lever 19, the fender drops to the track, thus preventing the living object or other obstruction in the path of the car from getting under the wheels. To bring the fender into its raised position, the arm 16 is lifted, and its eye 17 engaged with the hooked end 18 of the lever 19, which is then brought into its horizontal position, to be held therein by the stop 22.

What I claim is:—

1. The combination with the frame and platform of a car, of a basket-shaped fender pivotally attached to said platform and comprising a bottom, side walls and a rear wall, an arm fastened to the front end of said fender and provided with an eye at its upper end which projects above said platform, a lever pivoted to said frame and engaging said eye, a stop for holding said lever in a substantially horizontal position, and flexible connections between said platform and fender for limiting the lowest position thereof.

2. The combination with the frame and platform of a car, of a basket-shaped fender attached to said platform and comprising a bottom, side walls and a rear wall, said bottom being provided with two recesses arranged at a distance which corresponds to the distance between the rails of the track on which the car travels and being of dimensions to accommodate the cross section of the rails, an arm fastened to the front end of said fender and provided with an eye at its upper end which projects above said platform, a lever pivoted to said frame and engaging said eye, a stop for holding said lever in a substantially horizontal position, whereby said fender is held in its raised position, and flexible connections between said platform and fender for limiting the lowest position thereof.

Signed at New York, in the county of New York and State of New York, this 15th day of February, A. D. 1911.

BERNARD WEINBERGER.

Witnesses:
SIGMUND HERZOG,
S. BIRNBAUM.

---

Copies of this patent may be obtained for five cents each, by addressing the "Commissioner of Patents, Washington, D. C."